3,142,689
OXYDATION OF HYDROXY STEROIDS
Victor Gerardus Joseph Kersten and Max Salomon de Winter, Oss, Netherlands, assignors to Organon Inc., West Orange, N.J., a corporation of New Jersey
No Drawing. Filed Jan. 11, 1963, Ser. No. 250,783
Claims priority, application Netherlands Jan. 24, 1962
4 Claims. (Cl. 260—397.3)

The invention relates to a process for the oxidation of hydroxy steroids by means of chromic acid in the presence of an N,N-dialkyl-acylamide and an acid.

The oxidation of a hydroxy steroid to the corresponding keto compound is usually performed by treatment of the former with chromic acid. A generally applied oxidation method by means of a special chromic acid mixture is described by Günther Snatzke in Chem. Ber., page 729 (1961). The said oxidation method consists in that a steroid alcohol is reacted with a mixture of chromic acid ($CrO_3$), an N,N-dialkyl acylamide, usually dimethyl formamide, and a few drops of concentrated acid, preferably sulphuric acid. Hence this conversion is performed in anhydrous medium.

This oxidation method generally gives yields of about 80%, but in some cases, as in the oxidation of a 19-hydroxy-steroid to the corresponding 19-oxo-compound, a yield of no more than about 60% is obtained.

It has been found now that the yield of the known oxidation method can be appreciably raised to practically quantitative, if water is added to the mixture of chromic acid, an N,N-dialkyl acylamide and a concentrated acid, e.g. sulphuric acid.

Generally, improved yields are obtained by these modified reaction conditions of from 10 to 15%, while in case of oxidation of a 19-hydroxy steroid even increases in yield of over 35% are reached.

Furthermore the process according to the invention has a technical advantage as compared with the known method. For on adding chromotrioxide to, for example, dimethyl formamide, the mixture burns spectacularly in the air with flames, which may be very dangerous, especially when the process is performed on a manufacturing scale. The present improvement renders it possible to mix the chromotrioxide first with water and to add it after that to the solvent, when the said phenomon does not occur.

Hence the invention relates to the oxidation of primary and secondary steroid alcohols to the corresponding keto compounds by means of a mixture of chromic acid, an N,N-dialkyl-acylamide, an acid and water.

The process according to the invention can be applied to hydroxy steroids in general, such as those of the androstane, pregnane, cholane, cholestane and spirostane series.

The process is of special importance when started from 19-hydroxy steroids, especially those of the androstane series, as the thus obtained 19-oxo compounds can be easily converted to the important group of 19-nor-testosterone and derivatives thereof.

The process according to the invention is performed by reacting the relative hydroxy steroid with a mixture of chromotrioxide, an N,N-dialkyl acylamide, an acid and water.

Generally an excess of chromotrioxide is applied. Usually ⅔ to 2 mol per mol steroid.

For preference the N,N-dialkyl acylamide is an N,N-di(lower)-alkyl(lower)acylamide, such as dimethyl formamide, diethyl formamide, dimethyl acetamide and diethyl acetamide. Preferably dimethyl formamide is applied. The quantity of N,N-dialkyl acylamide usually amounts to 10–100 ml. per gram of steroid.

It has been found that the best results are obtained if 2–15 percent by volume of water, calculated on the amount of N,N-dialkyl-acylamide, is added to the oxidation mixture.

The reaction temperature and reaction period are interdependent. For preference the reaction is performed at a temperature below 60° C., usually between 30° and 60° C. The reaction period is not tied to strict limits, especially as regards the maximum. Usually a reaction period of from 2 to 20 hours is sufficient.

The invention is further illustrated by the following examples.

EXAMPLE I

To a solution of 5 g. of 19-hydroxy-testosterone-17-benzoate in 75 ml. of dimethyl formamide are added, at 40° C., 6.1 ml. of 8 N chromic acid solution (composition: 26.7 g. of $CrO_3$, 20 ml. of 96% $H_2SO_4$, replenished with water to 100 ml.).

The mixture is stirred for 4.5 hours at 40° C., after which it is cooled down to room temperature and poured out into 675 ml. of 1% sodium sulphite solution, whereupon the aqueous mixture is left to stand at room temperature for 1 hour, when the 19-oxo-testosterone-17-benzoate formed crystallises out. The crystallisate is sucked off, washed with water and dried to obtain 4.9 g. of 19-oxo-testosterone-17-benzoate; melting point 189–190° C.

By the method described above 3 g. of the $\Delta^4$-3,17-diketo-19-hydroxy-androstene are stirred for 2 hours at 55° C. by means of a mixture of 2.8 g. of chromotrioxide, 250 ml. of diethyl acetamide, some drops of concentrated $H_2SO_4$ and 10 ml. of water to obtain the $\Delta^4$-3,17,19-trioxo-androstene in a practically quantitative yield.

*Comparative Experiment Known Method*

2 g. of 19-hydroxy-testosterone-17-benzoate are dissolved in 25 ml. of dimethyl formamide, whereupon this mixture is added to a solution of 2 g. of chromotrioxide and 15 ml. of dimethyl formamide. After adding of 0.2 ml. of concentrated $H_2SO_4$ the reaction mixture is further treated as described above to obtain 1.28 g. of 19-oxo-testosterone-17-benzoate. The same yield is obtained if the reaction mixture is kept at room temperature for 16 hours.

EXAMPLE II 5.2 g. of $\Delta^4$-17-$\beta$-hydroxy-oestrene are dissolved in 60 ml. of dimethyl formamide and 1.2 ml. of water. To this solution are added, at 40° C., 10 ml. of 8 N chromotrioxide solution (26.7 g. of $CrO_3$, 20 ml. of 96% $H_2SO_4$, replenished with water to 100 ml.). The mixture is stirred for 3 hours at 40° C., after which it is cooled down and poured out into 540 ml. of 1% $Na_2SO_3$ solution, when the $\Delta^4$-17-keto-oestrene crystallises out. After cooling down for some time this compound is filtered off and the precipitate washed with water and dried in vacuo at 40° C. to obtain 4.2 g. of $\Delta^4$-17-keto-oestrene; melting point 114–116° C. From the mother liquor another quantity of 0.5 g. of this substance is obtained by extraction.

EXAMPLE III 4.5 g. of $\Delta^5$-3,17,19-trihydroxy-androstene-3-acetate-17-benzoate are dissolved in 170 ml. of dimethyl formamide, whereupon this solution is added to a mixture of 1.5 g. of chromotrioxide, a few drops of concentrated $H_2SO_4$ and 5 ml. of water. The mixture is stirred for 8 hours at 25° C., whereupon it is further worked up in accordance with the method described in Example I to obtain 4.3 g. of the $\Delta^5$-3,17-dihydroxy-19-oxo-androstene-3-acetate-17-benzoate. F 129–131°; $[\alpha]_D = 161.5°$.

In the same manner 3 g. of Δ⁵-3,17-diacetoxy-19-hydroxy-androstene are converted into the corresponding 19-oxo compound.

EXAMPLE IV

To a solution of 2 g. of 3α-hydroxy-11,20-diketo-pregnane in 30 ml. of dimethyl formamide a solution is added of 3 ml. of 8 N chromic acid (composition in accordance with Example I). The mixture is stirred for 5 hours at 35° C., then cooled down, diluted with 270 ml. of water and extracted with chloroform. The chloroform layer is separated and evaporated to dryness, whereupon the residue is recrystallised from a mixture of acetone and ether to obtain 1.77 g. of 3-11,20-triketo-pregnane with a melting point of 155.5–156.5° C. and $[\alpha]_D = +115°$ (chloroform).

EXAMPLE V

A mixture of 1.85 g. of chromotrioxide, some drops of concentrated $H_2SO_4$ and 4 ml. of water are added to a solution of 3 g. of Δ⁴-3,20-diketo-19-hydroxy-pregnene in 80 ml. of dimethyl formamide, whereupon the mixture is stirred for 5 hours at 45° C. Then the mixture is worked up as described in Example I to obtain the Δ⁴-3,19,20-trioxo-pregnene in a yield of 94%. F 138–140°; $[\alpha]_D + 250°$.

In the same manner the Δ⁵-3β-acetoxy-19-hydroxy-20-keto-pregnene has been converted into the corresponding 19-oxo compound.

We claim:

1. Process for the oxidation of a steroid alcohol selected from the group consisting of 3-hydroxy-, 17-hydroxy-, and 19-hydroxy-steroids of the androstane, pregnane, cholane, cholestane, and spirostane series, which comprises reacting said steroid alcohol with chromic acid in the presence of an N,N-dialkyl acylamide, sulfuric acid, and water.

2. The process of claim 1 in which the oxidation mixtures contain from about 2 to about 15 percent by volume of water, calculated on the amount of N,N-dialkyl acylamide.

3. The process of claim 1 in which the hydroxy-steroid is a member of the androstane series.

4. Process for the oxidation of a steroid alcohol selected from the group consisting of 3-hydroxy-, 17-hydroxy-, and 19-hydroxy-steroids of the androstane, pregnane, cholane, chloestane, and spirostane series, which comprises reacting said steroid alcohol with chromic acid in the presence of an N,N-dialkyl acylamide, sulfuric acid, and water, at a temperature between about 30° C. and about 60° C. for a period of about 2 to 20 hours.

No references cited.